(12) United States Patent
Inoue et al.

(10) Patent No.: US 10,525,955 B2
(45) Date of Patent: Jan. 7, 2020

(54) NEGATIVE-PRESSURE-TYPE BOOSTER DEVICE

(71) Applicant: ADVICS CO., LTD., Kariya-shi, Aichi-ken (JP)

(72) Inventors: Yoji Inoue, Toyoake (JP); Nan Li, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 188 days.

(21) Appl. No.: 15/567,483

(22) PCT Filed: May 27, 2016

(86) PCT No.: PCT/JP2016/065664
§ 371 (c)(1),
(2) Date: Oct. 18, 2017

(87) PCT Pub. No.: WO2016/194791
PCT Pub. Date: Dec. 8, 2016

(65) Prior Publication Data
US 2018/0118182 A1    May 3, 2018

(30) Foreign Application Priority Data
May 29, 2015    (JP) .................................. 2015-110467

(51) Int. Cl.
*B60T 13/57*    (2006.01)
*B60T 13/56*    (2006.01)
(Continued)

(52) U.S. Cl.
CPC ............... *B60T 13/57* (2013.01); *F16J 15/52* (2013.01); *F16K 15/144* (2013.01)

(58) Field of Classification Search
CPC ....... B60T 13/57; B60T 13/567; F16K 15/144
(Continued)

(56) References Cited

U.S. PATENT DOCUMENTS 3,013,533 A * 12/1961 Brown .................. B60T 13/244
60/547.1
3,013,535 A * 12/1961 Schultz ................. B60T 13/244
60/547.1
(Continued)

FOREIGN PATENT DOCUMENTS

EP    0 230 711 A1    8/1987
JP    60-024672 Y    7/1985
(Continued)

OTHER PUBLICATIONS

International Search Report (PCT/ISA/210) dated Jul. 12, 2016, by the Japanese Patent Office as the International Searching Authority for International Application No. PCT/JP2016/065664.
(Continued)

*Primary Examiner* — Thomas E Lazo
*Assistant Examiner* — Dustin T Nguyen
(74) *Attorney, Agent, or Firm* — Buchanan Ingersoll & Rooney PC

(57) ABSTRACT

A check valve of this negative pressure-type booster device is provided with: a cylindrical section that is integrally formed with a shell disposed on one side, communicates with a connection pipe, and is formed in a cylindrical shape protruding toward the inside of a housing; and a valve body section that is disposed inside the cylindrical section, and is axially fitted, within the cylindrical section, to the cylindrical section such that air is permitted to flow from a negative pressure chamber to the connection pipe while the air is prohibited from flowing from the connection pipe to the negative pressure chamber.

6 Claims, 4 Drawing Sheets

(51) Int. Cl.
*F16J 15/52* (2006.01)
*F16K 15/14* (2006.01)

(58) Field of Classification Search
USPC .................. 91/376 R; 137/496, 859, 526
See application file for complete search history.

(56) References Cited

U.S. PATENT DOCUMENTS

| | | | | |
|---|---|---|---|---|
| 3,465,786 A | * | 9/1969 | Spisak | F16K 15/144 |
| | | | | 137/494 |
| 3,499,288 A | * | 3/1970 | Randol | B60T 13/565 |
| | | | | 60/554 |
| 4,129,143 A | * | 12/1978 | Hoffmann | B60K 25/04 |
| | | | | 137/496 |
| 4,195,661 A | * | 4/1980 | Takeuchi | B60T 13/567 |
| | | | | 137/515.5 |
| 4,309,935 A | * | 1/1982 | Belart | B60T 13/563 |
| | | | | 91/376 R |
| 4,350,077 A | * | 9/1982 | Takeuchi | B60T 13/569 |
| | | | | 91/376 R |
| 4,554,786 A | * | 11/1985 | Takeuchi | B60T 17/02 |
| | | | | 417/151 |
| 4,628,959 A | | 12/1986 | Parker et al. | |
| 6,089,272 A | * | 7/2000 | Brand | A61M 39/24 |
| | | | | 137/852 |
| 2003/0089409 A1 | * | 5/2003 | Morimoto | B60S 1/52 |
| | | | | 137/859 |
| 2004/0188541 A1 | * | 9/2004 | Maruyama | B60S 1/481 |
| | | | | 239/284.1 |

FOREIGN PATENT DOCUMENTS

| | | |
|---|---|---|
| JP | 62-59159 A | 3/1987 |
| JP | 2014-196030 A | 10/2014 |

OTHER PUBLICATIONS

Written Opinion (PCT/ISA/237) dated Jul. 12, 2016, by the Japanese Patent Office as the International Searching Authority for International Application No. PCT/JP2016/065664.

* cited by examiner

NEGATIVE-PRESSURE-TYPE BOOSTER DEVICE

TECHNICAL FIELD

The present invention relates to a negative-pressure-type booster device.

BACKGROUND ART

In a negative-pressure-type booster device, a check valve (valve mechanism) is installed between a negative pressure chamber in a housing and a negative pressure source outside the housing. For example, Japanese Utility Model Publication No. 60-24672 discloses a negative-pressure-type booster device in which a check valve is disposed in a hose. Meanwhile, in recent years, a mode in which a check valve is directly attached to a housing has also been developed. The check valve is formed separately from the hose and the housing, and is assembled and fixed to the hose or the housing. The check valve is configured to allow air to circulate from a negative pressure chamber to a negative pressure source and to prohibit air from circulating from the negative pressure source to the negative pressure chamber. As a result, the negative pressure chamber is maintained at an appropriate pressure (negative pressure).

CITATION LIST

Patent Literature

Patent Literature 1: Japanese Utility Model Publication No. 60-24672

SUMMARY OF INVENTION

Technical Problems

However, in the mode in which the check valve is assembled to the housing as described above, a step of sealing a gap between the check valve and the housing with a grommet or the like is required. Further, in a conventional check valve, a step of welding (for example, ultrasonic welding) a valve seat and a cylindrical member that houses the valve seat is also required. Further, in a mode in which a check valve is assembled in a hose, a step of applying a lubricant agent to the inner peripheral surface of the hose and a step of press-fitting the check valve into an appropriate position in the hose are required. Further, due to these steps, the parts may be damaged by a load when the check valve is press-fitted, or the check valve function may also be deteriorated by the fixation of lubricant agent.

The present invention has been made in consideration of such circumstances, and has as its object to provide a negative-pressure-type booster device capable of installing a check valve by a simple step.

Solutions to Problems

There is provided a negative-pressure-type booster device according to the present invention including: a housing having a first shell and a second shell; a connection pipe connected to a negative pressure source; a movable partition partitioning an internal space in the housing into a negative pressure chamber on one side and a variable pressure chamber on the other side; a valve body retractably assembled to the housing and connected to the movable partition in the housing; an air valve disposed in a shaft hole formed in the valve body, capable of being retractable along an axial direction of the shaft hole with respect to the valve body, and moving integrally with an input shaft member; a negative pressure valve communicating or cutting-off the negative pressure chamber and the variable pressure chamber with each other or from each other in accordance with moving of the air valve with respect to the valve body; an atmospheric valve communicating or cutting-off the negative pressure chamber and atmosphere with each other or from each other in accordance with moving of the air valve with respect to the valve body; and a check valve connecting the connection pipe and the negative pressure chamber to each other. In this device, the check valve includes a cylindrical portion formed integrally with the first shell, communicating with the connection pipe, and disposed to cylindrically protrude toward the inside of the housing, and a valve body portion disposed in the cylindrical portion and axially fitted on the cylindrical portion in the cylindrical portion such that air is allowed to circulate from the negative pressure chamber to the connection pipe and prohibited from circulating from the connection pipe to the negative pressure chamber.

Advantageous Effects of Invention

According to the negative-pressure-type booster device of the present invention, the valve body portion is fitted on the cylindrical portion integrally formed with the first shell to make it possible to assemble the check valve between the connection pipe and the negative pressure chamber. That is, for example, the step of press-fitting into the hose, the step of applying the lubricant to the inside of the hose, the step of adhering and fixing the cylindrical member to the first shell, the step of welding the cylindrical member and the valve body, and the like are unnecessary, and the check valve can be installed by simple steps.

DESCRIPTION OF EMBODIMENTS

Figure 1:
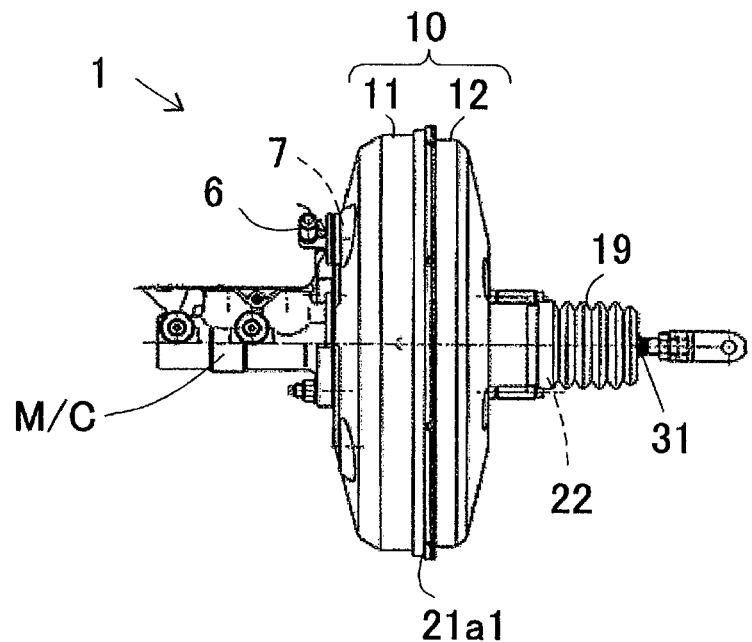
FIG. 1 is a block diagram showing an external configuration of a negative-pressure-type booster device according to a first embodiment.

Embodiments of the present invention will be described below with reference to the accompanying drawings. In all the following embodiments, the same reference numerals denote the same parts or equivalent parts, respectively, to explain the invention. In addition, each drawing used for explanation is a conceptual drawing, and the shape of each part is not necessarily rigid in some cases. In the explanation, one side of the negative-pressure-type booster device (the left side in a drawing) is defined as the front side, the other side (the right side in the drawing) as the rear side, and the vertical direction in the drawing as the vertical direction.
<First Embodiment>

Figure 2:
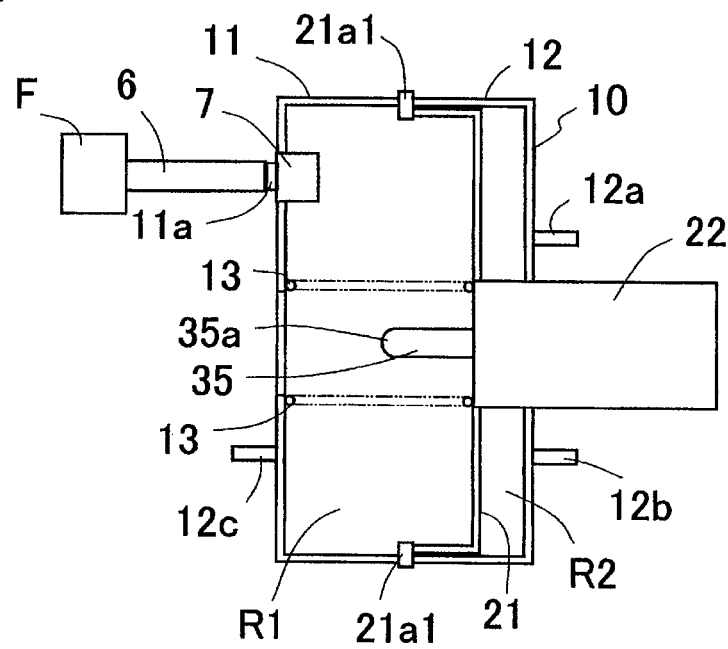
FIG. 2 is a block diagram showing the internal configuration of a negative-pressure-type booster device according to the first embodiment.
Figure 3:
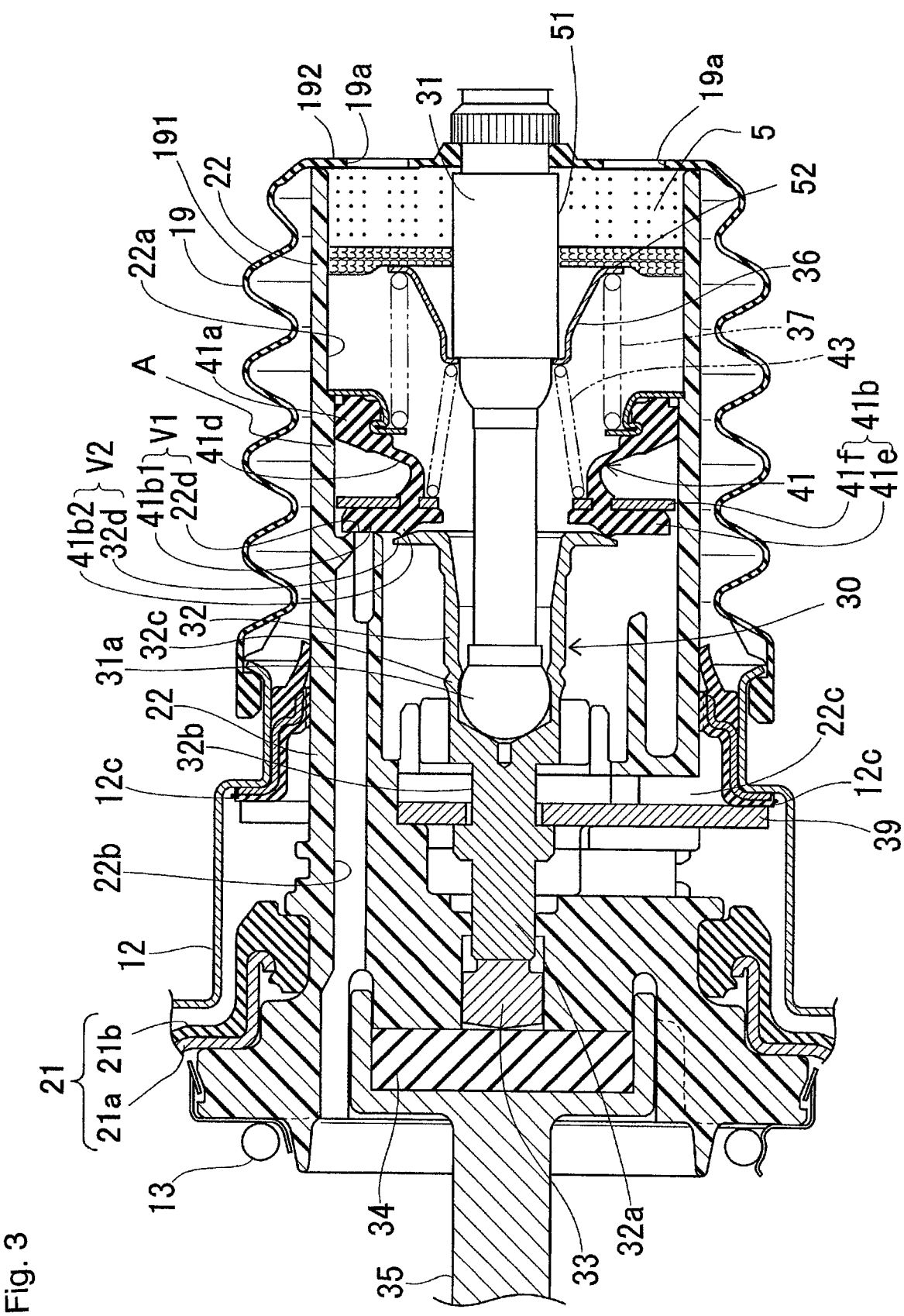
FIG. 3 is a cross-sectional view showing a configuration inside a valve body according to the first embodiment.

As shown in FIGS. 1 to 3, a negative-pressure-type booster device 1 mainly includes a housing 10, a power piston 20, an input member 30, a negative pressure valve V1, an atmospheric valve V2, a connection pipe 6, and a check valve 7.

The power piston 20 is assembled to the housing 10 so as to be movable forward/backward. The power piston 20 includes a movable partition 21 and a valve body 22. The interior of the housing 10 is partitioned by the movable partition 21 into a front negative pressure chamber R1 and a rear variable pressure chamber R2. The housing 10 includes a front shell 11 (corresponding to "first shell") arranged in front and a rear shell 12 (corresponding to "second shell") assembled to the rear end portion of the front shell 11.

The connection pipe 6 to always communicate the negative pressure chamber R1 with a negative pressure source F (for example, an intake manifold of engine) is connected to the front shell 11. Specifically, the front shell 11 has a cylindrical negative pressure leading portion 11a protruding integrally toward the outside of the housing 10. The negative pressure leading portion 11a is press-fitted into the connection pipe 6 and assembled. The negative pressure leading portion 11a is a portion that connects the connection pipe 6 and the check valve 7 to each other. The connection pipe 6 is a pipe connected to the negative pressure source F, and connects the negative pressure source F and the inside of the front shell 11 to each other.

The rear end portion of a brake master cylinder M/C is airtightly assembled to the front shell 11. A piston (not shown) of the brake master cylinder M/C protrudes rearward from the cylinder main body and projects into the negative pressure chamber R1 so as to be pushed forward by a distal end portion 35a of an output shaft 35 (will be described later). The front shell 11 includes the check valve 7 formed therein and will be described in detail later. The housing 10 includes mounting bolts 12a, 12b, and 12c. The mounting bolts 12a and 12b fix the housing 10 to a stationary member (that is, a vehicle body) (not shown). The mounting bolt 12c supports the brake master cylinder M/C.

The movable partition 21 is configured by an annular plate 21a and an annular diaphragm 21b. The movable partition 21 is disposed movably forward/backward (the axial direction of the power piston 20) in the housing 10. The diaphragm 21b is airtightly held on the housing 10 with an annular outer peripheral bead portion 21a1 formed on the outer peripheral edge of the diaphragm 21b. The diaphragm 21b is airtightly fixed to the outer peripheral portion of the valve body 22 together with the inner peripheral portion of the plate 21a by an annular inner peripheral bead portion 21a2 formed on the inner peripheral edge of the diaphragm 21b.

The valve body 22 is a hollow body made of a resin and connected to the inner peripheral portion of the movable partition 21, and is airtightly connected to the rear shell 12 of the housing 10 at the intermediate portion formed in a cylindrical shape so as to be movable forward/backward (in the axial direction of the power piston 20). That is, the valve body 22 is retractably assembled to the housing 10, and is connected to the movable partition 21 in the housing 10. The valve body 22 is biased rearward by a return spring 13 interposed between the valve body 22 and the front shell 11. The valve body 22 is formed with a stepped shaft hole 22a penetrating in the front-back direction. A filter 5 for filtering air flowing into the valve body 22 is disposed at the rear end portion of the shaft hole 22a. In the valve body 22, a pair of negative pressure communication paths 22b (only one of them is shown in the drawing) are formed. The negative pressure communication path 22b is a flow path whose rear end is opened to an intermediate step portion A of the shaft hole 22a and whose front end is opened to the negative pressure chamber R1. The valve body 22 is formed with a key attachment hole 22c which is substantially orthogonal to the front portion of the shaft hole 22a and through which a key member 39 (will be described later) can be inserted from the outer periphery.

A portion of the valve body 22 disposed outside the housing 10 is covered with a boot 19. The boot 19 is a rubber covering member having a bellows-like front portion 191 and a rear portion 192. The front end portion of the front portion 191 is engaged with the rear end portion of the rear shell 12. The rear portion 192 is formed integrally with the rear end portion of the front portion 191 and is disposed at the rear end portion of the valve body 22 so as to close the rear end opening of the valve body 22. In the rear portion 192, a plurality of ventilation holes 19a are disposed.

The input member 30 is a shaft-shaped member that moves forward in response to a brake operation. Specifically, the input member 30 includes an input shaft (corresponding to an "input shaft member") 31 and a plunger (corresponding to an "air valve") 32. The input shaft 31 and the plunger 32 are coaxially assembled to the shaft hole 22a. Further, in front of the plunger 32, a connection member 33, a reaction member 34, and an output shaft (output member) 35 are coaxially assembled with respect to the shaft hole 22a. The input shaft 31 is retractable with respect to the valve body 22, and is articulated to a transferring connection portion 32c of the plunger 32 at a spherical distal-end portion 31a.

Although not shown, the input shaft 31 is connected to a brake pedal through a yoke at a rear end threaded portion. The input shaft 31 moves forward in accordance with an operation of the brake pedal. The input shaft 31 can be said to be an input member to input stepping force to the brake master cylinder M/C. The input shaft 31 is engaged with the return spring 37 through a retainer 36 locked to the intermediate step portion A thereof and is biased rearward by a return spring 37. Further, the plunger 32 connected to the input shaft 31 is also biased rearward by the return spring 37. The retainer 36 is a cylindrical member disposed to the input shaft 31 coaxially with the input shaft 31. The retainer 36 is in contact with the filter 5. The retainer 36 has a function of returning the input shaft 31 to an initial position.

The plunger 32 is a member disposed in the shaft hole 22a formed in the valve body 22 and capable of being retractable in the axial direction of the shaft hole 22a with respect to the valve body 22 and integrally moving with the input shaft 31. The plunger 32 functions as an air valve. The plunger 32 is disposed so that its front end portion 32a can be in contact with the central portion of the rear surface of the reaction member 34 through the connection member 33. The front end portion 32a is a portion that partially receives reaction force from the reaction member 34 against the output through the connection member 33. An annular groove portion 32b is formed in an intermediate portion of the plunger 32. The annular groove portion 32b is formed to be able to be engaged with the key member 39. An annular atmospheric valve seat 32d constituting the atmospheric valve V2 is formed at the rear end portion of the plunger 32. The output shaft 35 is assembled together with the reaction member 34 so as to be movable in the front-back direction into the front end portion of the shaft hole 22a of the valve body 22. The distal end portion 35a of the output shaft 35 is in contact with a locking portion (recessed portion) of the piston in the brake master cylinder so as to be able to be moved by pushing. Upon braking operation, the output shaft 35 transmits the reaction force received from the piston of the brake master cylinder to the reaction member 34.

The key member 39 can be brought into and detached from the valve body 22, the plunger 32, and the housing 10 (the contact portion 12c), and regulates the movement amount along the axial direction of the plunger 32 with respect to the valve body 22. The key member 39 has a function of regulating the forward and backward movement of the plunger 32 with respect to the valve body 22 and a function of defining a backward movement limit position (the initial position of the valve body 22) of the power piston 20 with respect to the housing 10. The key member 39 is assembled to each of the valve body 22 and the plunger 32 so as to be relatively movable in the axial direction by a required amount.

The negative pressure valve V1 is a valve mechanism that communicates or cuts off the negative pressure chamber R1 and the variable pressure chamber R2 with each other or from each other in accordance with moving of the plunger 32 with respect to the valve body 22. In other words, the negative pressure valve V1 communicates and cuts off the negative pressure chamber R1 and the variable pressure chamber R2 according to a relative position between the valve body 22 and an input shaft 31 (input member 30). The negative pressure valve V1 includes a negative pressure valve portion 41b1 and a negative pressure valve seat 22d. The negative pressure valve portion 41b1 is a part of a valve body 41 arranged in the valve body 22.

The valve body 41 is, as a whole, a cylindrical member arranged in the shaft hole 22a. The valve body 41 includes a fixed portion 41a assembled to the inner peripheral surface of the valve body 22, a movable portion 41b movable in the axial direction with respect to the fixed portion 41a, and a connecting portion 41d connecting the fixed portion 41a and the movable portion 41b to each other. The movable portion 41b is disposed on the front side of the fixed portion 41a. The movable portion 41b is biased forward by a compression spring 43. The compression spring 43 is a compressed spring whose front end is in contact with the movable portion 41b and whose rear end is in contact with the retainer 36, and the compression spring 43 is formed to have a diameter which becomes smaller toward the rear end. The outer peripheral side of the front end portion of the movable portion 41b constitutes the negative pressure valve portion 41b1. In other words, the negative pressure valve portion 41b1 is formed at the front end portion of the movable portion 41b. Note that the movable portion 41b includes an elastic movable portion 41e made of an elastic material and a metal movable portion 41f formed in an annular plate shape made of a metal material fixed to the rear surface of the elastic movable portion 41e. The elastic movable portion 41e is integrally connected to the connecting portion 41d.

The negative pressure valve seat 22d is formed at the rear end portion of the negative pressure communication path 22b. In other words, the rear end portion of the negative pressure communication path 22b constitutes the negative pressure valve seat 22d. A state in which the negative pressure valve portion 41b1 is in contact with (seated on) the negative pressure valve seat 22d means closing of the negative pressure valve V1, and in a state in which the negative pressure valve portion 41b1 is separated (separated from the seat) from the negative pressure valve seat 22d means opening of the negative pressure valve V1.

The atmospheric valve V2 is a valve mechanism that communicates or cuts off the variable pressure chamber R2 with or from the ventilation hole 19a (atmosphere) in accordance with moving of the plunger 32 with respect to the valve body 22. In other words, the atmospheric valve V2 communicates or cuts off the variable pressure chamber R2 and the ventilation hole 19a in accordance with relative positions of the valve body 22 and the input shaft 31 (the input member 30). The atmospheric valve V2 includes an atmospheric valve portion 41b2 and the atmospheric valve seat 32d. The atmospheric valve portion 41b2 is a part of the valve body 41 and is formed on the inner peripheral side of the front end portion of the movable portion 41b. In other words, the inner peripheral side of the front end portion of the movable portion 41b constitutes the atmospheric valve portion 41b2. The atmospheric valve portion 41b2 is formed in an annular shape so as to be in contact with an entire circumference of the rear end face (atmospheric valve seat 32d) of the plunger 32 at the initial position. The atmospheric valve seat 32d is formed in an annular shape at the rear end portion of the plunger 32. In other words, the rear end portion (flange portion) of the plunger 32 constitutes the atmospheric valve seat 32d. A state in which the atmospheric valve portion 41b2 is brought into contact with (seated on) the atmospheric valve seat 32d means closing of the atmospheric valve V2 and a state in which the atmospheric valve portion 41b2 is separated from (separated from the seat) the atmospheric valve seat 32d means opening of the atmospheric valve V2.

(Check Valve)

Figure 4:
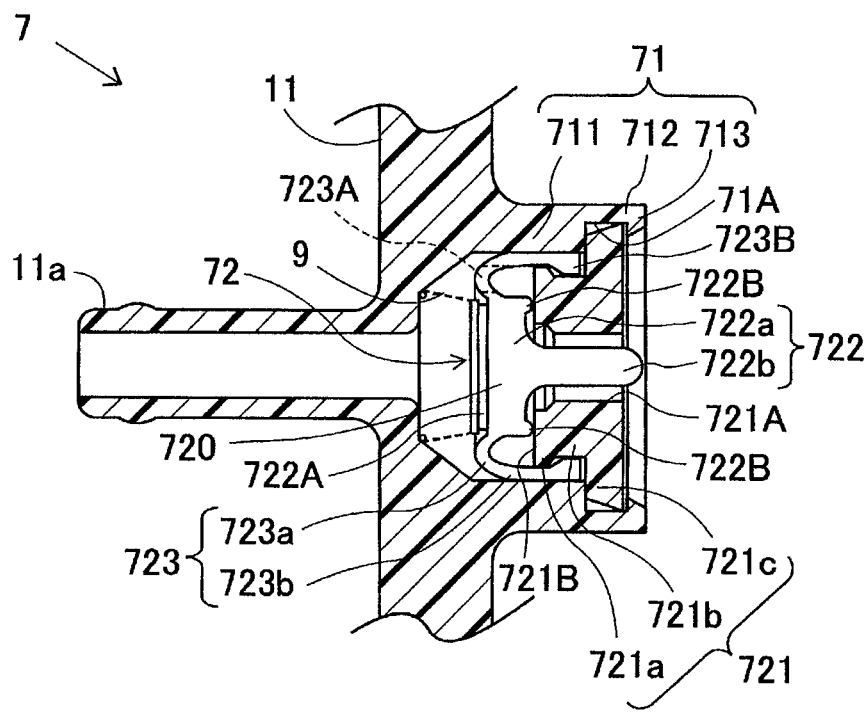
FIG. 4 is a cross-sectional view showing a configuration of a check valve according to the first embodiment.

The check valve 7 is a valve mechanism connecting the connection pipe 6 and the negative pressure chamber R1 to each other. In other words, the check valve 7 is a valve mechanism disposed on a flow path connecting the negative pressure source F and the negative pressure chamber R1 to each other. The check valve 7 is configured to allow air to circulate from the negative pressure chamber R 1 to the connection pipe 6 and to prohibit air from circulating from the connection pipe 6 to the negative pressure chamber R1. Specifically, as shown in FIG. 4, the check valve 7 includes the cylindrical portion 71 and the valve body portion 72.

The cylindrical portion 71 is formed integrally with the front shell 11, communicates with the connection pipe 6, and protrudes in a cylindrical shape toward the inside of the housing 10. The cylindrical portion 71 protrudes backward in a cylindrical shape from the inner peripheral surface of the front shell 11 corresponding to the negative pressure leading portion 11a. The cylindrical portion 71 is made of the same material (here, resin) as the front shell 11 and is formed integrally with the front shell 11. In detail, the cylindrical portion 71 includes a main body portion 711, a groove forming portion 712, and a snap locking portion 713.

The main body portion 711 is a front portion of the cylindrical portion 71 and connects the negative pressure leading portion 11a and the groove forming portion 712 to each other. The groove forming portion 712 is a rear portion of the cylindrical portion 71 and extends coaxially backward from the rear end of the main body portion 711. The inner diameter of the groove forming portion 712 is larger than the inner diameter of the main body portion 711. The snap locking portion 713 is a rear end portion of the cylindrical portion 71 and is formed at the rear end portion of the groove forming portion 712. The snap locking portion 713 is a portion to lock a valve seat member 721 (will be described later), and is formed to have an inner diameter which becomes smaller toward the front. The inner diameter of the front end portion of the snap locking portion 713 is smaller than the inner diameter of the groove forming portion 712. A groove 71A having a concave shape in the circumferential direction is formed on the inner peripheral side of the cylindrical portion 71 by the main body portion 711, the groove forming portion 712, and the snap locking portion 713.

The valve body portion 72 is a member separated from the cylindrical portion 71 disposed in the cylindrical portion 71, is fitted on the cylindrical portion 71 in the cylindrical portion 71 and positioned and fixed to allow air to circulate from the negative pressure chamber R1 to the connection pipe 6 and to prohibit air from circulating from the connection pipe 6 to the negative pressure chamber R1. Specifically, the valve body portion 72 includes the valve seat member 721, a valve body member 722, and a seal member 723 integrally formed with the valve body member 722.

The valve seat member 721 is a columnar member as a whole, and a communication path 721A for communicating the inside of the cylindrical portion 71 and the negative pressure chamber R1 with each other is formed at the central axis position of the valve seat member 721. It can also be said that the valve seat member 721 is cylindrical as a whole. The front end surface of the valve seat member 721 becomes a valve seat surface 721B. Specifically, the valve seat member 721 includes a front portion 721a, an intermediate portion 721b behind the front portion 721a, and a fitting portion 721c behind the intermediate portion 721b. The diameter of the front portion 721a is larger than the diameter of the intermediate portion 721b. The diameter of the fitting portion 721c is larger than the diameter of the front portion 721a. The front portion 721a and the intermediate portion 721b are disposed in the main body portion 711. The fitting portion 721c is disposed in a groove 71A of the cylindrical portion 71 over the entire circumference in the circumferential direction. That is, the valve seat member 721 is fitted on the cylindrical portion 71 in the axial direction. In other words, the valve seat member 721 is mechanically fitted on the cylindrical portion 71 by the snap locking portion 713. The valve seat member 721 and the cylindrical portion 71 are fitted on each other with a so-called snap fit.

Figure 5:
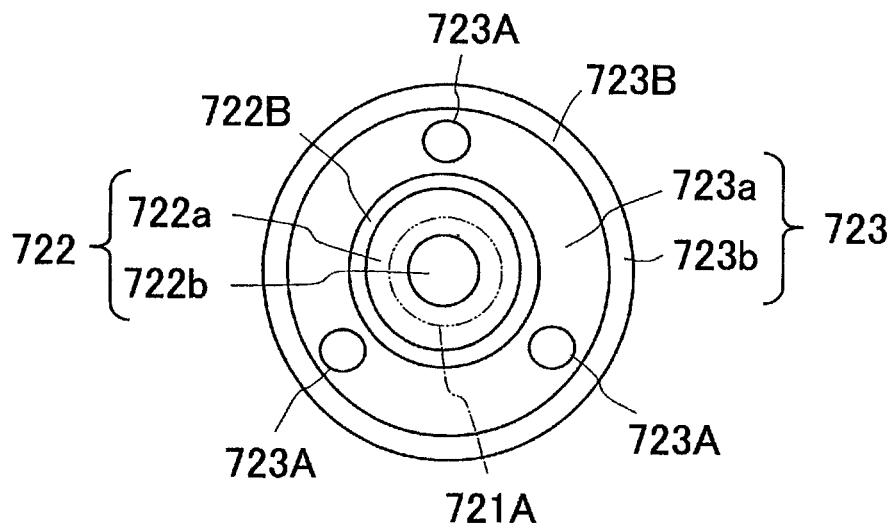
FIG. 5 is an explanatory view of the valve body (valve body member and seal member) according to the first embodiment when viewed from the rear.

As shown in FIGS. 4 and 5, the valve body member 722 is a columnar member as a whole, and is made of rubber in the first embodiment. The valve body member 722 is movable in the axial direction with respect to the valve seat member 721 and is configured to cut off the communication path 721A in a state in which the valve body member 722 is in contact with the valve seat surface 721B of the valve seat member 721 and to open the communication path 721A in a state in which the valve body member 722 is separated from valve seat surface 721B. The valve body member 722 is pressed and closed toward the valve seat member 721 by pressing force (for example, biasing force, pressure, or restoring force) from the state of being away from the valve seat member 721, and opens by cancellation of the pressing force (forward force larger than the pressing force) from the closed state.

Specifically, the valve body member 722 includes a front portion 722a and a rear portion 722b behind the front portion 722a. A groove 722A locking a spring 9 is formed at the front end portion of the front portion 722a. The spring 9 is a compressed spring whose one end is disposed on the inner peripheral surface of the front shell 11 (the front end portion of the cylindrical portion 71) and the other end is disposed in the groove 722A, and biases the valve body member 722 toward the valve seat member 721. The valve body member 722 is pressed against the valve seat member 721 by pressing force (biasing force) of the spring 9. An annular contact portion 722B that protrudes backward and is in contact with the valve seat surface 721B of the valve seat member 721 is formed at the rear end edge portion of the front portion 722a. In a state in which the contact portion 722B is in contact with the valve seat surface 721B, the connection pipe 6 and the negative pressure chamber R 1 are cut off from each other. The opening end of the communication path 721A is located inside (inside in the radial direction) the contact surface between the contact portion 722B and the valve seat surface 721B. The rear portion 722b is a columnar portion protruding backward from the center of the rear end surface of the front portion 722a. The rear portion 722b is disposed in the communication path 721A so as to be able to retractably move in the axial direction. The diameter of the rear portion 722b is smaller than the diameter of the communication path 721A.

As shown in FIGS. 4 and 5, the seal member 723 is an annular member brought into contact with the entire circumference of the inner circumferential surface of the cylindrical portion 71 (the main body portion 711) so as to seal a space between the cylindrical portion 71 and the valve seat member 721. The seal member 723 is made of rubber and is formed integrally with the valve body member 722. That is, the valve body member 722 and the seal member 723 are constituted by one member (part). In other words, the valve body member 722 and the seal member 723 constitute one valve body 720.

Specifically, the seal member 723 includes a curved portion 723a and a contact portion 723b. The curved portion 723a extends outward in the radial direction from the entire circumference of the outer peripheral surface of the front portion 722a of the valve body member 722 and is curved so as to expand forward. A cross section obtained by cutting the curved portion 723a in the radial direction has a convex arc shape. A plurality of communication holes 723A penetrating in the axial direction (front-back direction) are formed in the curved portion 723a.

The contact portion 723b is a cylindrical portion extending backward from the rear end portion of the curved portion 723a. The contact portion 723b is formed integrally with the curved portion 723a and is in contact with the entire circumference of the inner peripheral surface of the cylindrical portion 71 (entire circumference in the circumferential direction of the inner peripheral surface). The contact portion 723b presses the entire circumference of the inner peripheral surface of the main body portion 711 by the biasing force (restoring force) of the curved portion 723a. A locking portion 723B protruding inward in the radial direction is formed at the rear end portion of the contact portion 723b so as to be axially fitted on the front portion 721a and the intermediate portion 721b of the valve seat member 721. The rear end portion (locking portion 723B) of the contact portion 723b is also in contact with the intermediate portion 721b and is sandwiched between the intermediate portion 721b and the main body portion 711.

The seal member 723 is formed to have a tightening margin with respect to the inner peripheral surface of the main body portion 711 so as to form a curved portion (curved portion 723a). The seal member 723 achieves a radial seal to press the inner peripheral surface of the main body portion 711, that is, to have pressing force against the outside in the radial direction. In addition, the contact portion 723b is in contact with the intermediate portion 721b and/or the front portion 721a of the valve seat member 721 over the entire circumference, and a space between the seal member 723 and the valve seat member 721 is also sealed.

Here, when the force obtained by the pressure difference between the negative pressure source F side and the negative pressure chamber R1 side (the internal pressure of the connection pipe 6 <the internal pressure of the negative pressure chamber R1) exceeds the biasing force of the spring 9, the valve body member 722 moves forward, and the contact portion 722B separates from the valve seat surface 721B. Since the curved portion 723a deforms in accordance with the movement of the valve body member 722, the seal member 723 allows the valve body member 722 to move while maintaining the sealing function. In a state in which the contact portion 722B is separated from the valve seat surface 721B, the connection pipe 6 (negative pressure source F) and the negative pressure chamber R1 communicate with each other through the communication paths 721A and 723A. Even if the pressure on the negative pressure source F side becomes equal to or higher than the pressure in the negative pressure chamber R1, the valve body member 722 is pressed against the valve seat member 721, and a state in which the contact portion 722B and the valve seat face 721B are in contact (i.e., the closed state) is kept. That is, the check valve 7 functions as a check valve.

(Advantage)

According to the negative-pressure-type booster device 1 of the first embodiment, the valve body portion 72 is fitted on the cylindrical portion 71 integrally formed with the front shell 11 to make it possible to assemble the check valve 7 between the connection pipe 6 and the negative pressure chamber R1. In other words, for example, the step of press-fitting the valve body into the connection pipe 6, the step of applying the lubricant on the inside of the connection pipe 6, the step of adhesively fixing (sealing) the front shell 11 and the cylindrical member using a grommet, and the ultrasonic welding (sealing) step for the cylindrical member and the valve body, and the like are unnecessary to make it possible to install the check valve 7 at an appropriate position with simple steps. As described above, according to the first embodiment, the assembling property of the check valve 7 is improved. Further, since the valve body need not be press-fitted into the connection pipe 6, the parts are suppressed from being broken when the parts are assembled. In addition, a lubricant for assembling need not be used, and the check valve function is suppressed from being deteriorated due to the fixation of the lubricant.

In addition, since the seal member 723 seals a space (fitting portion) between the cylindrical portion 71 and the valve seat member 721, the check valve function can be accurately exerted without separately performing a sealing step (welding or the like). Further, since the seal member 723 is a radial seal that applies pressing force to the inside and outside in the radial direction to seal the valve seat member 721, the valve seat member 721 is suppressed from receiving force in the axial direction, and the valve seat member 721 is suppressed from coming off from the cylindrical portion 71. According to the first embodiment, the valve body member 722 and the seal member 723 are integrally formed, and a single part (valve body 720) can achieve sealing between the cylindrical portion 71 and the valve seat member 721 and closing of the valve of the communication path 721A (sealing at the time of valve closing). Thus, according to the first embodiment, the assembling property can be improved while the check valve function is maintained. Further, since the curved portion 723a of the seal member 723 deforms in accordance with the movement of the valve body member 722, even when the valve body member 722 moves, the contact of the contact portion 723b to the cylindrical portion 71 is maintained, and the sealing performance is secured. Forward movement of the valve body member 722 is absorbed by bending of the curved portion 723a, and the seal is maintained. Further, since the negative pressure leading portion 11a is formed integrally with the front shell 11, the number of parts is reduced.

<Second Embodiment>

The negative-pressure-type booster device of the second embodiment is different from that of the first embodiment primarily in the structure of the valve body portion. Accordingly, the different portions will be described, and the description of other portions will be omitted. As drawings, the drawings of the first embodiment can be referred to.

Figure 6:
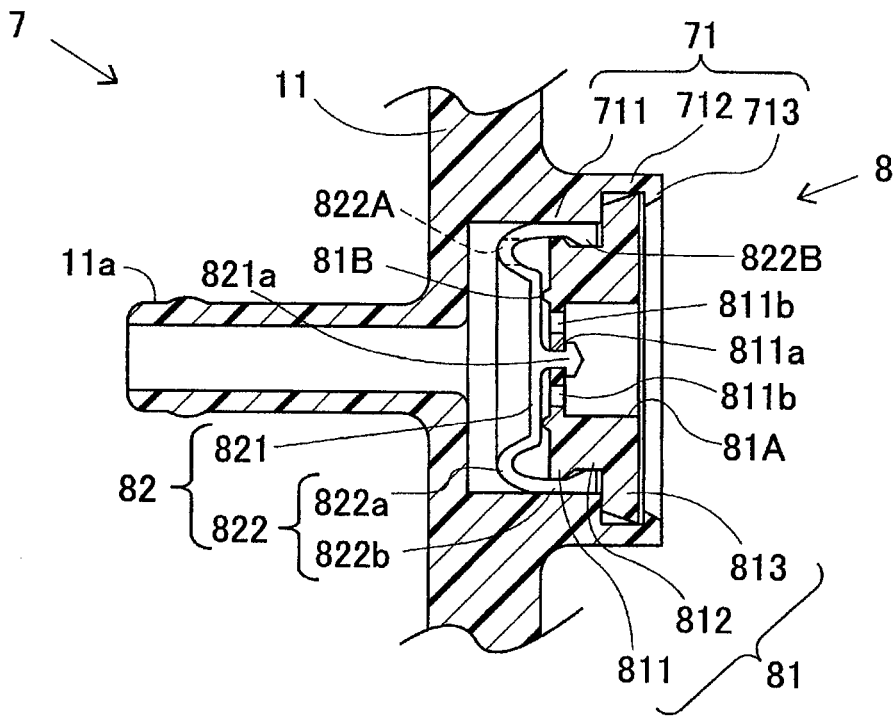
FIG. 6 is a cross-sectional view showing a configuration of a check valve according to a second embodiment.

As shown in FIG. 6, the check valve 7 of the second embodiment includes the cylindrical portion 71 and the valve body portion 8. The valve body portion 8 includes the valve seat member 81 and a film valve 82. The valve seat member 81 is a columnar member as a whole and has a communication path 81A communicating the inside of the cylindrical portion 71 and the negative pressure chamber R1 with each other at the central axis position thereof. An annular contact portion (corresponding to a "valve seat surface") 81B protruding forward is formed on the front end surface of the valve body portion 8.

Figure 7:
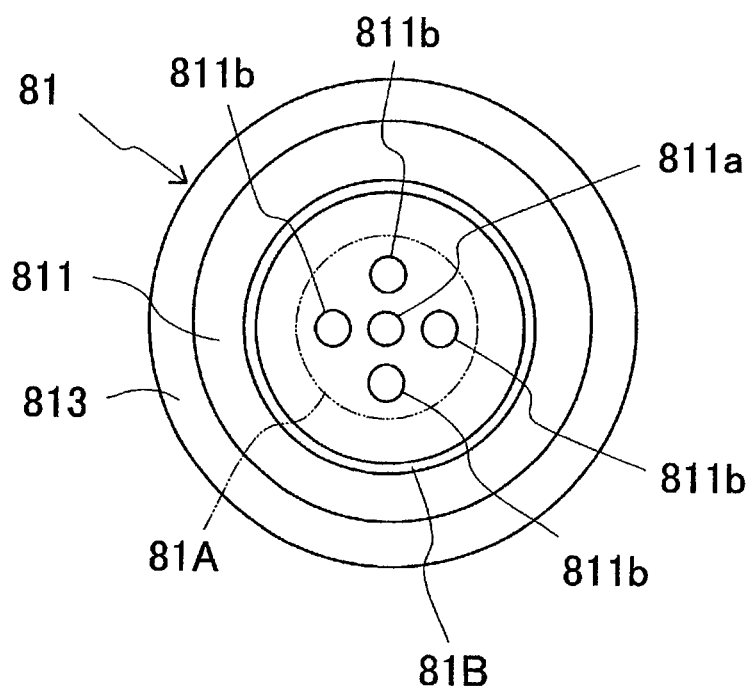
FIG. 7 is an explanatory view of a valve seat member according to the second embodiment when viewed from the front.

Like the first embodiment, the valve seat member 81 includes a front portion 811, an intermediate portion 812 behind the front portion 811, and a fitting portion 813 behind the intermediate portion 812. The diameter of the front portion 811 is larger than the diameter of the intermediate portion 812. The diameter of the fitting portion 813 is larger than the diameter of the front portion 811. The front portion 811 and the intermediate portion 812 are disposed in the main body portion 711. The fitting portion 813 is disposed in the groove 71A of the cylindrical portion 71 over the entire circumference in the circumferential direction. That is, the valve seat member 81 is fitted on the cylindrical portion 71 in the axial direction. As shown in FIGS. 6 and 7, a fitting hole 811a into which the film valve 82 is fitted in the axial direction is formed in the central portion of the front portion 811. A plurality of through holes 811b penetrating in the axial direction are formed around the fitting hole 811a. The through holes 811b are formed inside (inward in the radial direction) of the contact portion 81B of the front portion 811. The through holes 811b constitute a part of the communication path 81A. That is, the communication path 81A including the through holes 811b communicates the negative pressure leading portion 11a and the negative pressure chamber with each other.

The film valve 82 is a valve body formed of a film, and has a central portion 821 corresponding to the valve body member 722 of the first embodiment and a seal portion 822 corresponding to the seal member 723 of the first embodiment. The central portion 821 has a disk-like shape, and on the center of the rear end surface thereof, a protruding portion 821a protruding backward and fitting in the fitting hole 811a is formed. The rear end surface of the central portion 821 is in contact with the entire circumference of the contact portion 81B in an initial state (fitted state). That is, in the original state (restored state), the check valve 7 is in a closed state. When the pressure in the connection pipe 6 is higher than the pressure in the negative pressure chamber R1, the central portion 821 is pressed toward the valve seat member 81 side by the pressure difference to maintain a closed state. On the other hand, when the pressure in the connection pipe 6 is lower than the pressure in the negative pressure chamber R1, the central portion 821 is pressed in a direction away from the valve seat member 81 due to the pressure difference. Then, when the force caused by the pressure difference becomes greater than the restoring force of the film valve 82, the edge portion of the central portion 821 deforms and separates from the contact portion 81B to open the valve. In this way, when at least a part of the seal member 723 deforms to move (move forward) the edge portion of the central portion 821, the check valve 7 opens. In other words, the check valve 7 of the second embodiment is configured to be opened and closed by utilizing a pressure difference to make the spring 9 unnecessary.

The seal portion 822 is formed in the same shape as that of the seal member 723 of the first embodiment. That is, the seal portion 822 includes a curved portion 822a and a contact portion 822b. The curved portion 822a is formed in a convex arc shape expanding forward in a radially outward direction from the entire circumference of the outer peripheral edge of the central portion 821. A plurality of communication holes 822A are formed in the curved portion 822a as in the first embodiment. As in the first embodiment, the contact portion 822b is in contact with the entire circumference of the inner peripheral surface of the cylindrical portion 71, is in contact with the entire circumference of the outer periphery of the valve seat member 81 (intermediate portion 812 and/or front portion 811), is axially fitted on the valve seat member 81 at the end portion. At the rear end of the contact portion 822b, a locking portion 822B is formed. According to the second embodiment, the same effect as in the first embodiment is exerted. In the second embodiment, the spring 9 is unnecessary to facilitate assembly.

<Others>

The present invention is not limited to the above embodiments. For example, the front shell 11 and the cylindrical portion 71 may be made of a material (for example, metal) other than resin and integrally formed. In addition, in the formation of the front shell 11 and the cylindrical portion 71, insert molding using different materials may be used. Further, the seal member 723 is not limited to a radial seal having pressing force toward the inside and outside in the radial direction, but may be an axial seal having pressing force in the axial direction. Further, the negative-pressure-type booster device may be of a tie-rod type.

The invention claimed is:

1. A negative-pressure-type booster device comprising:
a housing having a first shell and a second shell, the first shell formed integrally with a negative pressure leading portion disposed to cylindrically protrude toward the outside of the housing;
a connection pipe fitted to the negative pressure leading portion and connected to a negative pressure source;
a movable partition partitioning an internal space in the housing into a negative pressure chamber on one side and a variable pressure chamber on the other side;
a valve body retractably assembled to the housing and connected to the movable partition in the housing;
an air valve disposed in a shaft hole formed in the valve body, capable of being retractable along an axial direction of the shaft hole with respect to the valve body, and moving integrally with an input shaft member;
a negative pressure valve communicating or cutting-off the negative pressure chamber and the variable pressure chamber with each other or from each other in accordance with moving of the air valve with respect to the valve body;
an atmospheric valve communicating or cutting-off the negative pressure chamber and atmosphere with each other or from each other in accordance with moving of the air valve with respect to the valve body; and
a check valve connecting the connection pipe and the negative pressure chamber to each other,
wherein
the check valve includes a cylindrical portion formed integrally with the first shell, communicating with the connection pipe, and disposed to cylindrically protrude toward the inside of the housing, and a valve body portion disposed in the cylindrical portion and axially fitted on the cylindrical portion in the cylindrical portion such that air is allowed to be circulated from the negative pressure chamber to the connection pipe and prohibited from circulating from the connection pipe to the negative pressure chamber, and
the cylindrical portion, the first shell and the negative pressure leading portion are formed as a monolithic structure.

2. The negative-pressure-type booster device according to claim 1, wherein the valve body portion includes:
a valve seat member having a communication path communicating the connection pipe with the negative pressure chamber, and a valve seat surface;
a valve body member capable of moving in an axial direction with respect to the valve seat member, cutting off the communication path in a state in which the valve body member is in contact with the valve seat surface, and opening the communication path in a state in which the valve body member is separated from the valve seat surface; and
a seal member which is brought into contact with and presses an entire circumference of an inner peripheral surface of the cylindrical portion and is brought into contact with and presses an entire circumference of an outer peripheral surface of the valve seat member so as to seal a space between the cylindrical portion and the valve seat member.

3. The negative-pressure-type booster device according to claim 2, wherein the seal member includes a curved portion which 1) is integrally formed with the valve body member and 2) has a communication hole, and a contact portion which 1) is formed integrally with the curved portion and 2) is in contact with the entire circumference of the inner circumferential surface of the cylindrical portion to press the cylindrical portion.

4. The negative-pressure-type booster device according to claim 3, wherein the valve body member and the seal member comprise, in combination, a film valve.

5. The negative-pressure-type booster device according to claim 2, wherein the valve body member and the seal member comprise, in combination, a film valve.

6. The negative-pressure-type booster device according to claim 1, wherein an inner diameter of an opening of the cylindrical portion opened toward the negative pressure chamber side is larger than an inner diameter of an opening of the negative pressure leading portion opened toward the negative pressure chamber side.

* * * * *